United States Patent
Yu et al.

(10) Patent No.: US 10,147,021 B2
(45) Date of Patent: Dec. 4, 2018

(54) AUTOMATIC SURVEILLANCE VIDEO MATTING USING A SHAPE PRIOR

(71) Applicant: General Electric Company, Schenectady, NY (US)

(72) Inventors: Ting Yu, Niskayuna, NY (US); Peter Henry Tu, Niskayuna, NY (US); Xiaoming Liu, Schenectady, NY (US); Ser Nam Lim, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 285 days.

(21) Appl. No.: 15/056,669

(22) Filed: Feb. 29, 2016

(65) Prior Publication Data

US 2016/0180199 A1     Jun. 23, 2016

Related U.S. Application Data

(63) Continuation of application No. 13/290,928, filed on Nov. 7, 2011, now Pat. No. 9,305,357.

(51) Int. Cl.
| | |
|---|---|
| *G06K 9/62* | (2006.01) |
| *H04N 5/272* | (2006.01) |
| *G06K 9/52* | (2006.01) |
| *G06T 11/60* | (2006.01) |
| *G06T 7/33* | (2017.01) |
| *G06T 7/11* | (2017.01) |
| *G06T 7/194* | (2017.01) |

(52) U.S. Cl.
CPC ............ *G06K 9/6256* (2013.01); *G06K 9/52* (2013.01); *G06K 9/621* (2013.01); *G06T 7/11* (2017.01); *G06T 7/194* (2017.01); *G06T 7/33* (2017.01); *G06T 11/60* (2013.01); *H04N 5/272* (2013.01); *G06T 2207/20081* (2013.01); *G06T 2207/20221* (2013.01); *G06T 2207/30196* (2013.01); *G06T 2207/30204* (2013.01)

(58) Field of Classification Search
CPC ........ G06K 9/6256; G06K 9/52; G06K 9/621; H04N 5/272; G06T 7/194; G06T 7/11; G06T 7/33; G06T 11/60; G06T 2207/20081; G06T 2207/20221; G06T 2207/30196; G06T 2207/30204
See application file for complete search history.

(56) References Cited

U.S. PATENT DOCUMENTS

| | | | |
|---|---|---|---|
| 6,020,930 | A | 2/2000 | Legrand |
| 7,274,803 | B1 | 9/2007 | Sharma et al. |
| 7,692,664 | B2 | 4/2010 | Weiss et al. |
| 7,711,155 | B1 | 5/2010 | Sharma et al. |
| 7,742,623 | B1 | 6/2010 | Moon et al. |

(Continued)

*Primary Examiner* — Nhon T Diep
(74) *Attorney, Agent, or Firm* — Jean K. Testa; Fletcher Yoder, P.C.

(57) ABSTRACT

A novel technique for performing video matting, which is built upon a proposed image matting algorithm that is fully automatic is disclosed. The disclosed methods utilize a PCA-based shape model as a prior for guiding the matting process, so that manual interactions required by most existing image matting methods are unnecessary. By applying the image matting algorithm to these foreground windows, on a per frame basis, a fully automated video matting process is attainable. The process of aligning the shape model with the object is simultaneously optimized based on a quadratic cost function.

18 Claims, 6 Drawing Sheets

(56) References Cited

U.S. PATENT DOCUMENTS

| | | |
|---|---|---|
| 7,898,522 B2 | 3/2011 | Hildreth et al. |
| 7,912,246 B1 | 3/2011 | Moon et al. |
| 7,921,036 B1 | 4/2011 | Sharma et al. |
| 7,930,204 B1 | 4/2011 | Sharma et al. |
| 7,974,869 B1 | 7/2011 | Sharma et al. |
| 7,987,111 B1 | 7/2011 | Sharma et al. |
| 8,009,863 B1 | 8/2011 | Sharma et al. |
| 8,027,521 B1 | 9/2011 | Moon et al. |
| 8,098,888 B1 | 1/2012 | Mummareddy |
| 8,204,308 B2 | 6/2012 | Yamada |
| 8,605,148 B2 * | 12/2013 | Robertson ............ H04N 5/275 348/135 |
| 8,897,562 B2 | 11/2014 | Bai et al. |
| 2002/0070858 A1 | 6/2002 | Gutta et al. |
| 2002/0138830 A1 | 9/2002 | Nagaoka et al. |
| 2005/0198661 A1 | 9/2005 | Collins et al. |
| 2007/0271580 A1 | 11/2007 | Tischer et al. |
| 2008/0075334 A1 | 3/2008 | Determan et al. |
| 2008/0109397 A1 | 5/2008 | Sharma et al. |
| 2009/0217315 A1 | 8/2009 | Malik et al. |
| 2009/0285456 A1 | 11/2009 | Moon et al. |
| 2010/0046830 A1 | 2/2010 | Wang et al. |
| 2010/0322474 A1 | 12/2010 | Cheriyadat et al. |
| 2011/0038536 A1 | 2/2011 | Gong |
| 2012/0128226 A1 | 5/2012 | John et al. |
| 2015/0030219 A1 | 1/2015 | Madabhushi et al. |

\* cited by examiner

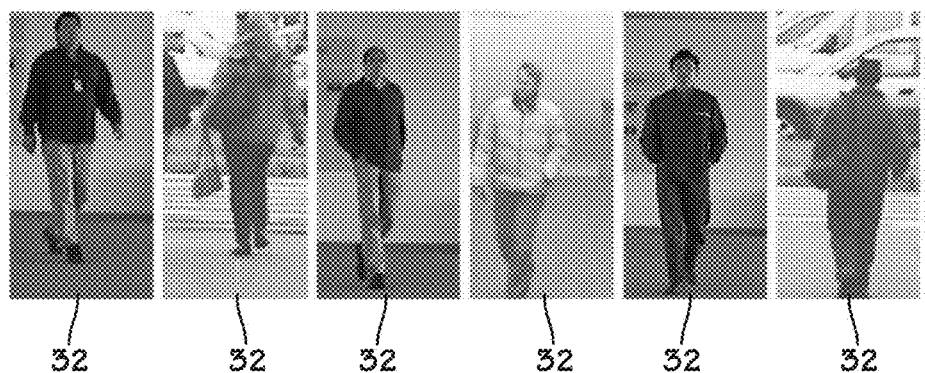

36  38  40  42

AUTOMATIC SURVEILLANCE VIDEO MATTING USING A SHAPE PRIOR

CROSS-REFERENCE TO RELATED APPLICATION

This application is a continuation of U.S. application Ser. No. 13/290,928 entitled "Automatic Surveillance Video Matting Using a Shape Prior," filed on Nov. 7, 2011, which is hereby incorporated by reference in its entirety.

BACKGROUND

The present disclosure relates generally to surveillance, and more particularly to video matting in surveillance applications.

Image matting is an operation in photo editing that extracts a foreground image from a background region, such that the composite of a foreground image can be imposed onto a background of choice. One technique for image matting includes estimating the foreground opacity or "alpha matte" at every pixel and extracting those pixels that have high foreground opacity. One challenge with this technique, is extracting, with high confidence, initial foreground and background regions that would then guide the matting process in fully determining the foreground opacity at every pixel. To accomplish this, most existing methods rely on manual input that indicates foreground and background regions. For instance, an alpha matte can be estimated efficiently in close form through an elegant formulation of a quadratic cost function.

The use of manual interactions is, however, unsuitable for performing video matting, a process in which the matte estimation of a foreground object from a video sequence is desired. As can be appreciated, video matting may be a more challenging problem when compared to image matting, because manually marking foreground and background regions for every frame of a video sequence comprising a large number of image frames is impractical. One attempt to automate the matting process includes marking keyframes in foreground and background regions, followed by interpolation based on background and optical flow estimation. Another proposed technique to accomplish unsupervised video matting utilizes cues from spectral segmentation. This technique is described by A. Levin., A. Rav-Acha and D. Lischinski in a paper entitled: Spectral Matting, submitted in conjunction with *Proc. of IEEE Int'l Conf. on Computer Vision and Pattern Recognition (CVPR)*, Minneapolis, Minn., June 2007, now published at IEEE Transactions on Pattern Analysis and Machine Intelligence 30(10), 1-14 (2008), which is hereby incorporated by reference. Since it is well known that the image segmentation problem itself is an ill-posed problem, manual interactions are inevitable if one wishes to achieve a reasonable level of accuracy.

BRIEF DESCRIPTION OF THE DRAWINGS

FIGS. 5-11 illustrate data samples, data comparison and experimental results using the automated matting algorithm in accordance with embodiments of the invention.

DETAILED DESCRIPTION

Figure 1:
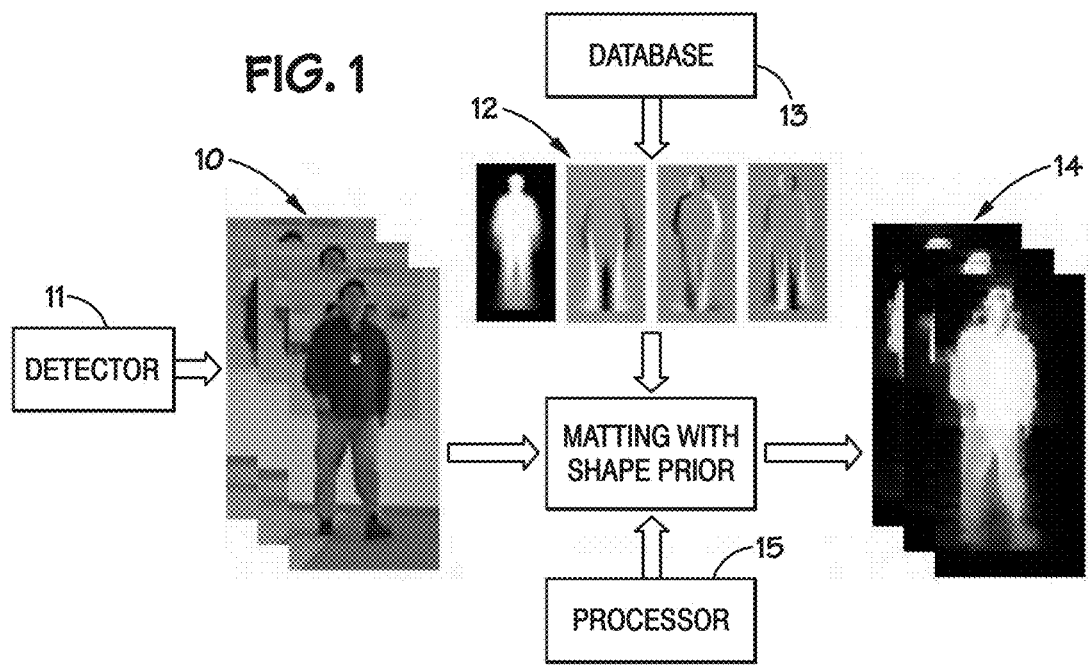
FIG. 1 is a schematic illustration of an automated matting algorithm in accordance with embodiments of the invention.

As described further below, a fully automatic (i.e., without human involvement) and reliable video matting algorithm that is capable of accurately determining foreground opacity may be useful in a number of applications. For instance, in a surveillance environment, a person detector may be used to provide foreground windows, per frame, such that the techniques described herein may be used to automatically provide video image matting. That is, as is illustrated in FIG. 1 and described throughout the instant application, sample video frames 10 may be combined with shape models 12 to provide a fully automated matting algorithm to produce automatic video matting images 14 for surveillance applications, for instance.

The present techniques provide a fully automatic algorithm utilizing a quadratic cost function that efficiently computes the matte in closed form. This technique is based on prior techniques that have been described by A. Levin, D. Lischinski and Y. Weiss in a paper entitled: A Closed Form Solution to Natural Image Matting, submitted in conjunction with *Proc. of IEEE Int'l Conf. on Computer Vision and Pattern Recognition (CVPR)*, New York City, June 2006, now published at IEEE Transactions on Pattern Analysis and Machine Intelligence 30(2), 1-15 (2008), which is hereby incorporated by reference. In accordance with embodiments of the presently described invention, a shape model or "shape prior" is incorporated into the previously described quadratic cost function. The shape model has been built from a set of training data, which essentially replaces the manual inputs required to "kickstart" the prior art matting processes. The application of shape prior in accordance with the present embodiments is motivated by its successful application to several domains, most notably object segmentation, where learned shape priors are used for guiding the segmentation process, as opposed to segmentation algorithms that require manual interactions. Additionally, in accordance with the present techniques, a principal component analysis (PCA) based approach towards learning the shape priors is adopted.

With particular relevance to the surveillance domain, it is important to consider the spatial alignment of the shape prior to the object, as existing person detectors are incapable of providing "perfect" foreground windows. Typically, offsets between the true location of the person and the center of the window due to localization uncertainties from the detector often arise. Even under the assumption of static background so that typical background subtraction algorithms can be employed, the presence of shadows or changes in lighting often cause such misalignment problems. To address this issue in accordance with embodiments of the present techniques, the unknown transformation parameters of aligning the shape prior to the true location window of the person can be recovered using Gauss-Newton method simultaneously during the optimization process, as described in detail below.

In accordance with the embodiments described herein, a fully automatic image matting algorithm, guided by a shape model, to achieve automatic video matting in surveillance environments is described. In contrast to previous matting techniques that use shape priors and employ manual interactions to help correct misalignment between the applied shape prior and the object region, the presently described techniques are capable of recovering the transformation parameters automatically. By unifying the estimation of the matte guided by the shape model and the alignment of the shape prior with the object into a single objective function, improvements in video matting can be realized.

Compute Alpha Matte

As previously described, spectral matting may be employed to compute an alpha matte for a given image I. In spectral matting (or "Laplacian matting"), fundamental matting components are extracted from an input image I based on analyzing the smallest eigenvectors of a suitably defined Laplacian matrix.

To compute the alpha matte given an image I, the color of the $i^{th}$ pixel, $I_i$, can be considered to be a linear combination of the foreground and background colors:

$$I_i = \alpha_i F_i + (1-\alpha_i) B_i, \tag{1}$$

where $\alpha_i$, referred to as the foreground opacity, controls the contribution of the foreground, $F_i$, and background, $B_i$, terms. Estimating these unknown quantities is, however, an underconstrained problem, since each pixel of a 3-channel color image would be associated with three equations and seven unknowns. Consequently, it is impossible to solve for Eq. (1) without introducing additional constraints. Such constraints have been proposed and previously described in the art. As previously described in the art, if an assumption of color linear model could be made, then in a small window, $\omega$, around each pixel, F and B could be represented with a linear mixture of two colors. As a result the compositing, Eq. (1) can be transformed and approximated by a 4D linear model:

$$\alpha_i \approx \sum_c a^c 1_i^c + b, \forall i \in \omega \tag{2}$$

where $I_i^c$ is the $c_{th}$ channel color value of ith pixel, and $a^c$ and b are unknown variables related to the foreground and background colors of pixels in the local window $\omega$.

By manipulating Eq. (2) a cost function that is quadratic in $\alpha$ and in which the a and b terms can be eliminated, can be derived.

$$J(\alpha) = \alpha^T L \alpha \tag{3}$$

L, referred to as the "matting Laplacian," is a square matrix of size M×M, that captures the local color properties of the input image containing M pixels. Its $(i,j)^{th}$ element is given as:

$$\sum_{k|(i,j)\in\omega_k} \left( \delta_{ij} - \frac{1}{|w_k|} \left( 1 + (I_i - \mu_k)^T \left( \Sigma_k + \frac{\epsilon}{|\omega_k|} I_3 \right)^{-1} (I_j - \mu_k) \right) \right), \tag{4}$$

where $\delta_{ij}$ is the Kronecker delta function. Within $\omega_k$, the color distribution is described by a 3×3 covariance matrix, $\Sigma_k$, and a 3×1 vector, $\mu_k$, representing the mean pixel colors. $I_3$ is a 3×3 identity matrix.

If there are no other constraints, it is clear that any $\alpha$ vector that lies in the null space of L constitutes a valid solution. On the other hand, any meaningful solution would have to be consistent with a well-defined notion of the foreground and background regions. To obtain such information, manual interactions for explicitly marking initial foreground and background regions are employed so that a valid solution can subsequently be obtained by minimizing $$\operatorname*{argmin}_{\alpha} J(\alpha) = \operatorname*{argmin}_{\alpha} \alpha^T L \alpha + \lambda (a - b_s)^T D_a (\alpha - b_s), \tag{5}$$

where $\lambda$ is a weighting factor, $D_s$ is a diagonal matrix whose diagonal elements contain 1 for marked pixels and 0 otherwise, and $b_s$ is a vector containing the user-specified alpha values for the marked pixels and 0 for all other pixels. The optimal solution can then be obtained by computing the derivative of Eq. (5) over $\alpha$, setting it to 0, and then solving a sparse linear system equation as follows:

$$(L + \lambda D_s)\alpha = \lambda b_s, \tag{6}$$

Incorporate Shape Model

While the closed form solution in Eq. (6) is acceptable for certain applications, its dependency on manual interactions makes it less suitable for video matting. The task of marking foreground and background regions in every frame of a video sequence is prohibitive. To overcome such a problem in accordance with embodiments of the present techniques, a shape model 12 (FIG. 2) may be utilized to replace manual interactions.

Figure 2:
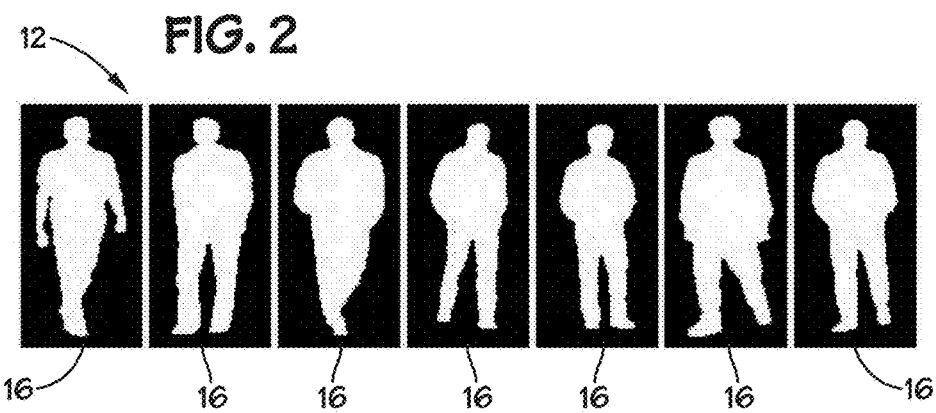
FIG. 2 is a schematic illustration of a shape model that may be used in an automated matting algorithm in accordance with embodiments of the invention.

Given a shape database for an object category of interest, $S = \{S_1, S_2, \ldots, S_N\}$, where $S_i$ is the $i^{th}$ shape training data represented as a binary map and all shape images are spatially registered, a PCA-based shape prior model may be trained through eigen-analysis. The trained model can then be used to represent a shape as:

$$S(u) = Vu + \Delta = \sum_{i=1}^{N} V_i u_i + \Delta, \tag{7}$$

where $\Delta$ is the mean shape, $V = [V_1, V_2, \ldots, V_N]$ are the eigen-bases, and $u = [u_1, u_2, \ldots, u_N]$ are the basis coefficients. FIG. 2 illustrates a shape model 12 with training examples 16 that may be used to learn the shape model for walking people. These learned PCA-shape bases may be utilized to conduct video matting in a surveillance application, for example as shown in FIG. 1. Incorporating such a shape prior model would then modify the cost function to:

$$\operatorname*{argmin}_{\alpha,u} J(a, u) = \operatorname*{argmin}_{\alpha,u} \alpha^T L \alpha + \lambda(\alpha - (Vu + \Delta))^T (\alpha - (Vu + \Delta)), \tag{8}$$

which can be solved with the following sparse linear system:

$$\begin{pmatrix} (L + \lambda I) & -\lambda V \\ -V^T & V^T V \end{pmatrix} \begin{pmatrix} \alpha \\ u \end{pmatrix} = \begin{pmatrix} \lambda \Delta \\ -V^T \Delta \end{pmatrix}. \tag{9}$$

Incorporate Alignment Parameters

To this point, it has been implicitly assumed that the shape model is properly aligned with the object. Such an assumption is frequently violated, particularly in the surveillance domain, where it is impractical to assume that the foreground window provided by a person detector is well-aligned with the object. The spatial transformation that would re-align the shape model with the object is, however, an unknown property until the foreground matte can be correctly solved. To overcome such a dilemma, in accordance with embodiments of the present techniques, both estimation problems can be solved simultaneously through the following iterative optimization process.

Let ω(x; t) be the spatial transformation that maps a pixel from an image location, x, to a location ω(x; t) in the shape model coordinate system. Here, $t=[t_1, t_2, \ldots, t_q]$ denotes the unknown parameter vector of ω. It is also important to point out that the spatial transformation from image to shape model, as opposed to the reverse, is computationally desirable since the Laplacian matrix, L, only needs to be computed once for each input image (where such an "input image", in the present example, would come from the foreground window provided by a person detector).

After applying the transformation to obtain V (ω(x; t))= $[V_1(ω(x; t)), V2(ω(x; t), \ldots, V_N(ω(x; t))]$, and mean shape Δω(x; t)), an optimal (α, u, t) that minimizes the quadratic cost defined over L is calculated. Initially, $$\operatorname*{argmin}_{\alpha,u,t} J(\alpha, u, t) = \operatorname*{argmin}_{\alpha,u,t} \alpha^T L\alpha + \lambda \|\alpha - (V(\omega(x;t))u + \Delta(\omega(x;t)))\|. \quad (10)$$

Figure 3:
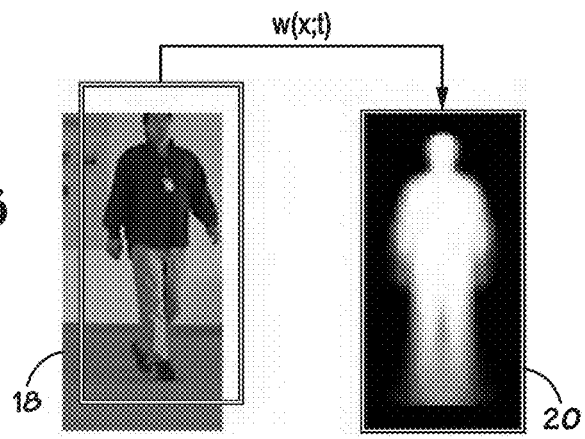
FIG. 3 is a schematic illustration of realignment of a matte image that may be incorporated into an automated matting algorithm in accordance with embodiments of the invention.

With this formulation, there are three unknowns to be estimated simultaneously, namely α the unknown matte, u the shape basis coefficients, and t the transformation parameters. Such a cost function is quadratic over α and u, but nonconvex over t, since $V_i(ω(x; t))$ is essentially nonlinear over ω(x; t), and solving it may require some type of costly global optimization procedure. For this reason, an assumption may be made that the unknown center of the object is near the center, $t_0$, of the input image 18 to re-align the matte image 20, (as shown in FIG. 3), which is a valid assumption in most cases. Starting from $t_0$, a transformation update δt can be iteratively solved through the Gauss-Newton method. Specifically, in accordance with embodiments of the present techniques, these three unknowns may be solved in two iterative steps, which update (α, u) and t respectively, as described below.

Solving for α and u

Given an updated transformation parameter t'=t+δt, we warp the shape model as V'=$[V_1ω(x; t)), V_2ω(x; t)), \ldots, V_Nω(x; t))]$ and mean shape Δ=Δω(x; t)), and solve α and u using Eq. (9).

As is evident, the left hand side matrix (LHSM) of the linear equation in Eq. (9) is a block matrix comprising four blocks. (L+λI) is the largest sub-matrix in this LHSM with dimension M×M where M is the number of pixels in the input image. V', the shape prior space, is an M×N matrix, where N is the number of learned shape bases and is typically much smaller than M. In addition, the Laplacian matrix L does not change during iteration due to the spatial transformation from image space to shape model space. As a result, the inverse of (L+λI) need only be computed once. Next, the inverse of the LHSM may be computed, using known techniques. Though this block matrix inverse involves an inverse computation of an M×M sub-matrix, defined by $[(L+\lambda I)-\lambda V(V'^T V')^{-1} V'^T]$, because of its symmetric form, the inverse operation may be simplified by using matrix inversion lemma. Thus, in every iteration, only the inverse of the $V'^T V'$ needs to be computed, which is only an N×N matrix, and thus much cheaper and easier to compute.

Solving for t

Once an updated (u',u') and current estimate t are obtained, an update δt that minimizes the cost function in Eq. (10) is calculated. Since we fix (u',u') at this stage, it is equivalent to minimize the quantity $$\operatorname*{argmin}_{\delta t} J(\delta t) = \operatorname*{argmin}_{\delta t} \|\alpha' - (V(\omega(x;t+\delta t))u' + \Delta(\omega(x;t+\delta t)))\| \quad (11)$$
$$= \operatorname*{argmin}_{\delta t} \left\| \alpha' - \left( \sum_{i=1}^{N} V_i(\omega(x;t+\delta t))u'_i + \Delta(\omega(x;t+\delta t)) \right) \right\|.$$

The term $V_i(ω(x; t+δt))$ could then be expanded using a first-taylor expansion around its current t, i.e., $$V_i(\omega(x;t+\delta t))=V_i(\omega(x;t))+J_i(t)\delta t, \quad (12)$$

where $J_i$ is the Jacobian matrix of $V_i$ with respect to t. This is an M×q matrix that could be written in column form as $$J_i(t)=[V_{i,t_1}\omega(x;t)|V_{i,t_2}\omega(x;t)| \ldots |V_{i,t_q}\omega(x;t)]. \quad (13)$$

Similar linear expansion can also be applied to the mean shape vector Δ(ω(x; t+δt)) to obtain its Jacobian $J_\Delta(t)$.

After expansion, the cost function defined in Eq. (11) becomes quadratic with respect to δt, so that the solution can now be obtained in closed form by solving a linear equation. One challenge, at this point, is that computing the Jacobian matrices $J_i(t)$ of all shape bases $V_i$, i∈[i, N] during each iteration, is expensive and computationally complex.

However, this computational burden can be reduced by realizing that the Jacobian terms for the shape basis and mean shape do not need to be computed separately due to the linear relationship between them. Rather, a new term can be defined as $$\beta(\omega(x;t+\delta t)) = \sum_{i=1}^{N} V_i(\omega(x;t+\delta t))u'_i + \Delta(\omega(x;t+\delta t)), \quad (14)$$

where β(ω(x; t+δt)) is essentially the reconstructed matte from the updated shape prior, and conduct a taylor-expansion around the new term instead. The transformation update δt can now be derived as $$\delta t = (J_\beta(t)^T J_\beta(t))^{-1} J_\beta(t)^T (\alpha' - \beta(\omega(x;t))), \quad (15)$$

which solves a q×q matrix inverse problem, and thus can be computed very efficiently.

The above two-step optimization is then conducted iteratively until either the maximum number of iterations allowed is reached or little improvement is observed. In experiments described below a good solution has been found quickly. For instance, a good solution may typically be found within 20 iterations.

Figure 4:
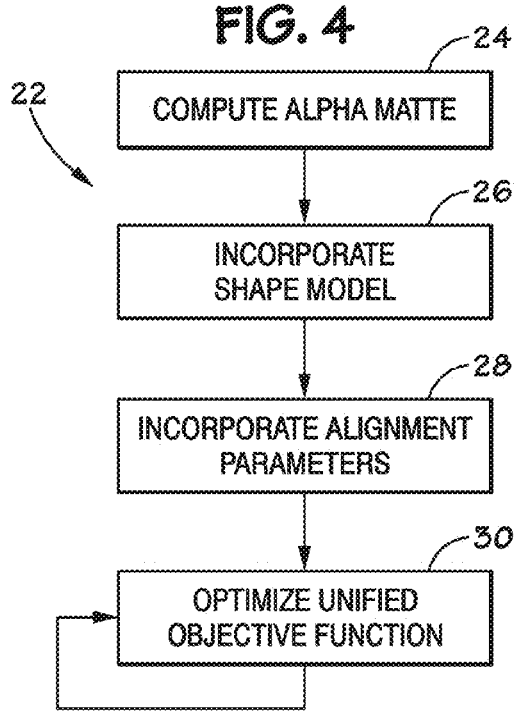
FIG. 4 is a flow chart illustrating an automated matting methodology in accordance with embodiments of the invention.
Figure 9:

The process for automatic video matting, in accordance with embodiments of the present invention, is illustrated in the flow chart 22 of FIG. 4. First, an alpha matte is computed, as in block 24. Once the alpha matte is determined, a shape model may be incorporated into the alpha matte, as in block 26. Further, alignment parameters may be incorporated into the model, as in block 28. Finally, the unified objective function may be optimized, as in block 30. That is, in accordance with one embodiment of block 30, a two-step optimization, including solving for the alpha matte (α) and the shape basis coefficients u, and the transformation parameters t, simultaneously may be conducted. The optimization process of block 30 may be repeated iteratively, until either a maximum number of iterations is reached or little improvement between images is observed.

As discussed further below the successful application of the disclosed algorithm to the surveillance domain, which demands an algorithm that works in practical situations, has been demonstrated. In a surveillance context, several potential applications of the disclosed methods can be considered. One example where such an automatic matting algorithm can be extremely useful is the area of foreground detection. It is commonly understood that the computed matte can be used to guide the foreground detection process, but the supervised nature of the matting process has so far prohibited such synergy. In the surveillance community, researchers are also frequently faced with difficulties in conducting experiments, where privacy issues often prevent them from running experiments on unsuspecting subjects, or, where there is often a lack of subjects. The need for video synthesis is becoming increasingly evident, but synthesizing video is unfortunately a very challenging problem. An automatic matting algorithm is a positive move in this direction where the user could conceivably extract participating subjects from video sequences for the purpose of synthesizing new video sequences. Additionally, visual appearance modeling and signature learning of humans, which are mainly used for person tracking and identity recognition in a typical surveillance scene, can also benefit from this automatic matting method disclosed herein, because a soft matte provides a more detailed confidence measure for these methods to choose the right pixels in order to learn their models.

Experimental Data

The proposed matting algorithm was evaluated with real-world images of people walking in typical indoor and outdoor surveillance environments. In all experiments, $\lambda$ was set such that $\lambda=0.01$.

First, the algorithm was evaluated on still images and the results were compared quantitatively with the method incorporated by reference above in the paper by Levin et al., entitled "A Closed Form Solution to Natural Image Matting." It is important to point out that the latter method was run with extensive manual interactions, whereby foreground and background regions were repeatedly marked as required to get the best possible matting results. Comparatively, the disclosed method was run in a fully unsupervised manner. The goal of this test is to demonstrate quantitatively the "closeness" of the performance of the disclosed automated method to the user-guided method, with the expectation that the user-guided method would logically produce better results.

Upon establishing from the still image experiments the efficacy of the disclosed method, experiments for evaluating the utility of the disclosed method when applied to video sequence was evaluated. The quality of the video sequences used in these experiments, being captured from typical CCTV cameras, is naturally much poorer than those datasets used in most previous work. Despite that, the video results demonstrate the capability of the disclosed methods in consistently producing good matte maps, unsupervised, for a video sequence. Testing on these real-world video sequences thus reinforce the efficacy of the disclosed methods for practical usage.

Creation of Shape Database

To learn the PCA-based shape prior, 215 binary images of the foreground of people were manually labeled. Each training image was resized to a standard 80×40 pixels, i.e. M=3200, and spatially aligned. Some training samples 16 are illustrated in FIG. 2, as previously discussed. 99% of the sample covariance was retained, leading to a total of N=182 shape bases. A subset of learned PCA shape bases is illustrated in FIG. 1, as previously discussed. The set of shape bases was then used for both the still image and video experiments as shape priors.

Still Image Results

A set of 375 images were then collected, and the image patch containing the walking people was cropped and used as input images 32, as shown in FIG. 5. While the windows containing subjects were manually selected here for evaluation using ground truths, in real-world applications, these windows are presumably provided by a person detector. To simulate the scenario that the foreground window may not be well aligned with the center of the image window, the bounding box location around the true location was randomly perturbed. Based on the ground truths, measurements of the accuracy of the spatial aligning capability of the disclosed algorithm were made. For simplicity, translation was only applied to the test images (i.e., $\omega(x; t)$ does not contain any rotational component). In practice, specifically under a surveillance context where people are expected to walk upright, this is generally a valid simplification. However, as discussed above, with regard to the incorporation of alignment parameters, complex transformation should also be recoverable under the disclosed framework. Further, a subset of test samples was also selected to perform a pixel-wise quantitative comparison with Levin's manual algorithm. As mentioned, manual interactions were provided as required to achieve the best results from the algorithm. These results were then compared with those of the disclosed algorithm by computing pixel-wise differences in the matte values.

FIG. 6, illustrates some of the matting results using the disclosed algorithm. The top row displays the original test images 32, and the bottom row shows the computed mattes 34. As illustrated, the matte maps 34 are qualitatively able to match the body shapes of the original test images 32, with the poses correctly estimated. In this case, even though there were significant distractions from background clutters (e.g., cars and other objects), the algorithm returned good matte maps 34 that are spatially aligned, automatically.

Figure 7:
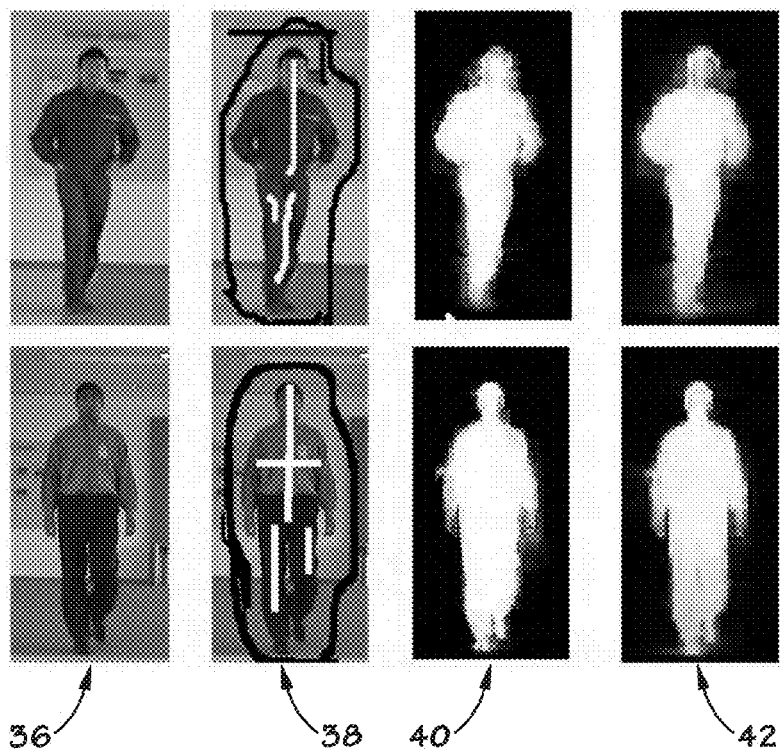

A comparison of the results returned by the disclosed automatic approach and Levin's manual method is illustrated in FIG. 7. The left column 36 shows the original images, the second column 38 displays manual inputs required by Levin's method, the third column 40 shows the results using Levin's manual method, and the right column 42 shows results using the disclosed automatic methodology. Qualitatively, the differences between these two approaches are relatively minor. The main difference is that the matte map obtained through the disclosed method is relatively darker, due to the PCA-based shape prior, which provides a probabilistic score instead of a binarized score as in Levin's manual method.

Figure 8:
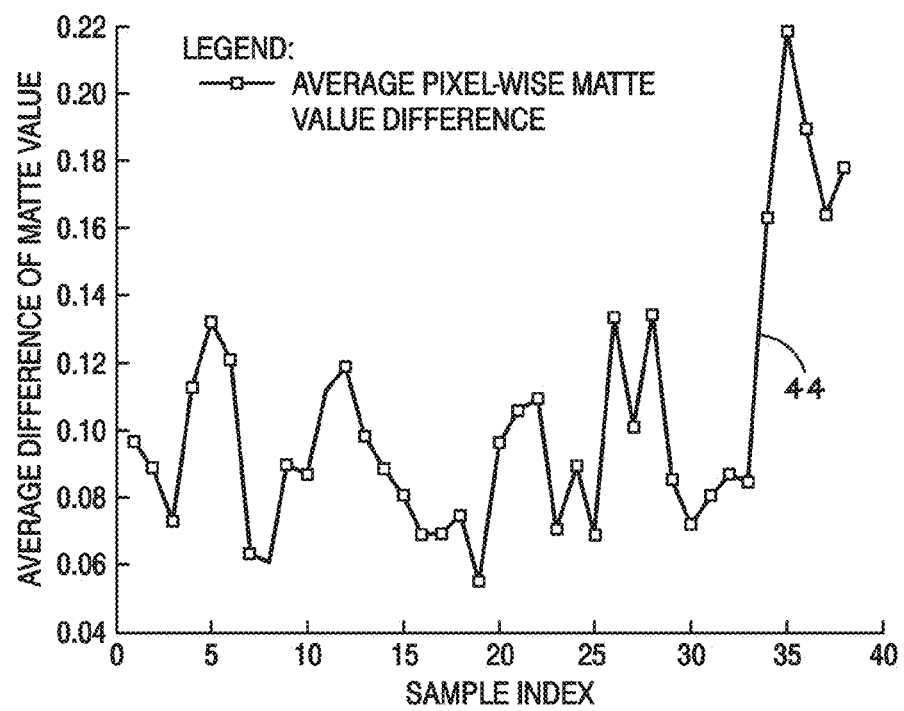

FIG. 8 illustrates a plot 44 of the average pixel-wise matte difference between the results returned by the disclosed methods and those by Levin's method for a subset of the test images. The average difference observed is less than 0.14, which is a good indication that disclosed unsupervised method advantageously achieves accuracy close to the interactive matting method.

The qualitative effect of not conducting spatial alignment was also observed. FIG. 8 demonstrates the advantages of spatial alignment, in accordance with the present techniques. The left column 46 shows the original images, the middle column 48 displays the results obtained by directly applying the shape prior, as described above, without considering alignment, and the right column 50 shows the results of the full approach described herein. It was observed that without spatially aligning the shape priors, the results are much worse.

Figure 10A:
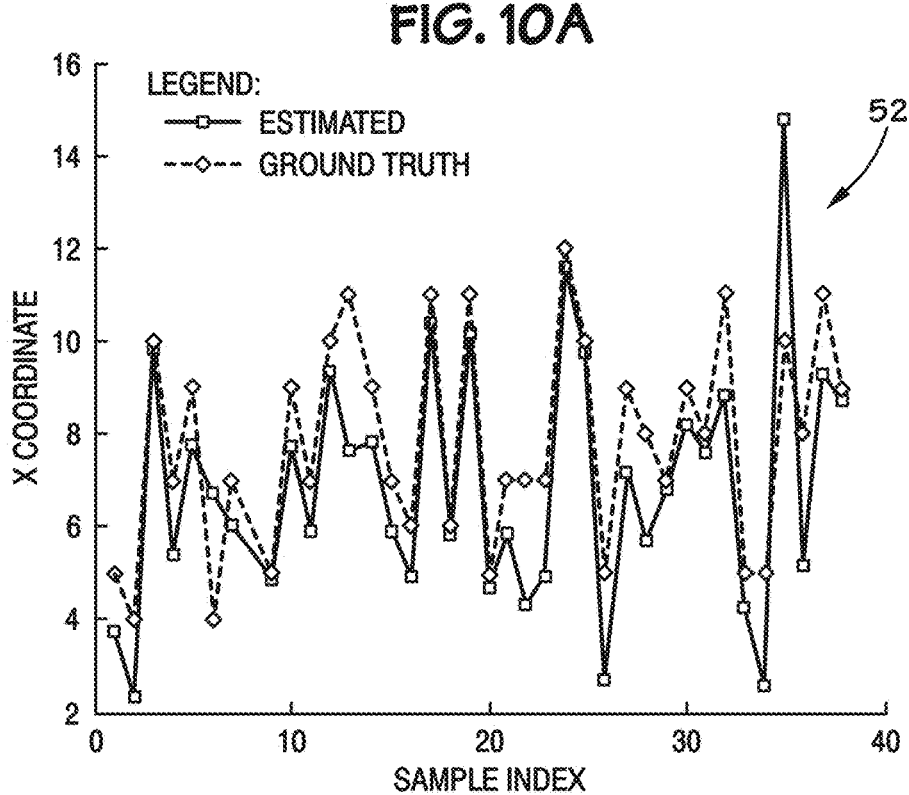
Figure 10B:
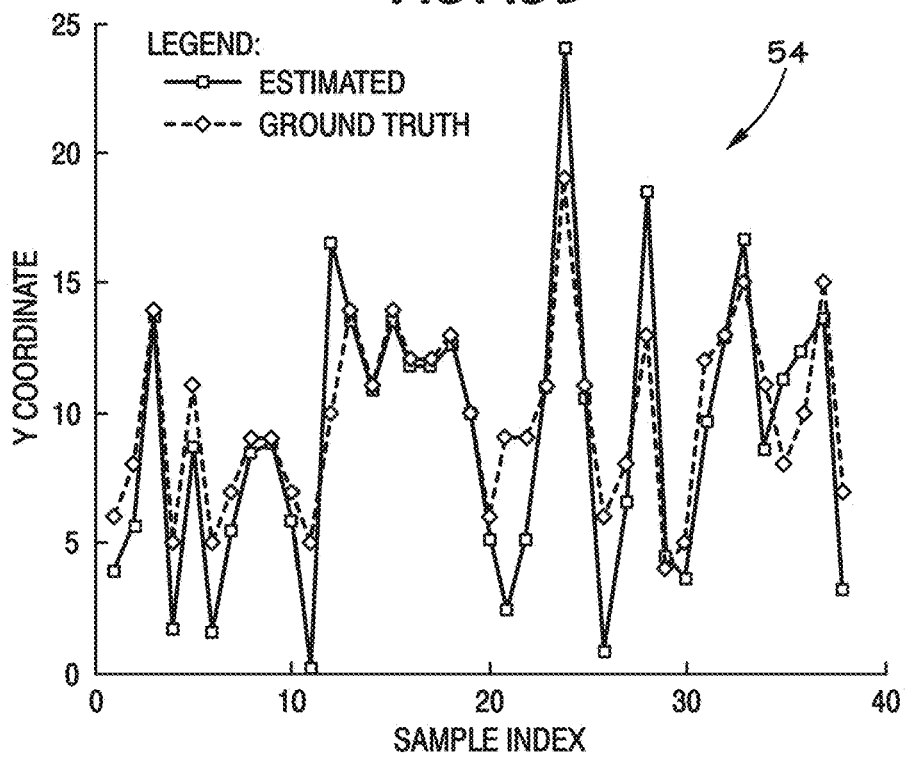

Finally, to quantify the accuracy of conducting spatial alignment simultaneously in the optimization process, as described herein, we compared the spatial alignment estimated by the disclosed algorithm and the actual amount of alignment required based on the ground truths, as shown in the plots 52 and 54 of FIGS. 10A and 10B, using the same image subset in FIG. 8. The shifting is computed along the x-direction and the y-direction, as illustrated in FIGS. 10A and 10B, respectively. In most cases, the estimated amount is close to the actual amount. The average alignment error between the estimation and ground truth over this subset is 1.25 pixels and 2.18 pixels along the x and y direction, respectively. Overall, with respect to the size of the test images (80×40), the performance of the proposed alignment algorithm is very promising.

Video Results

Figure 11:
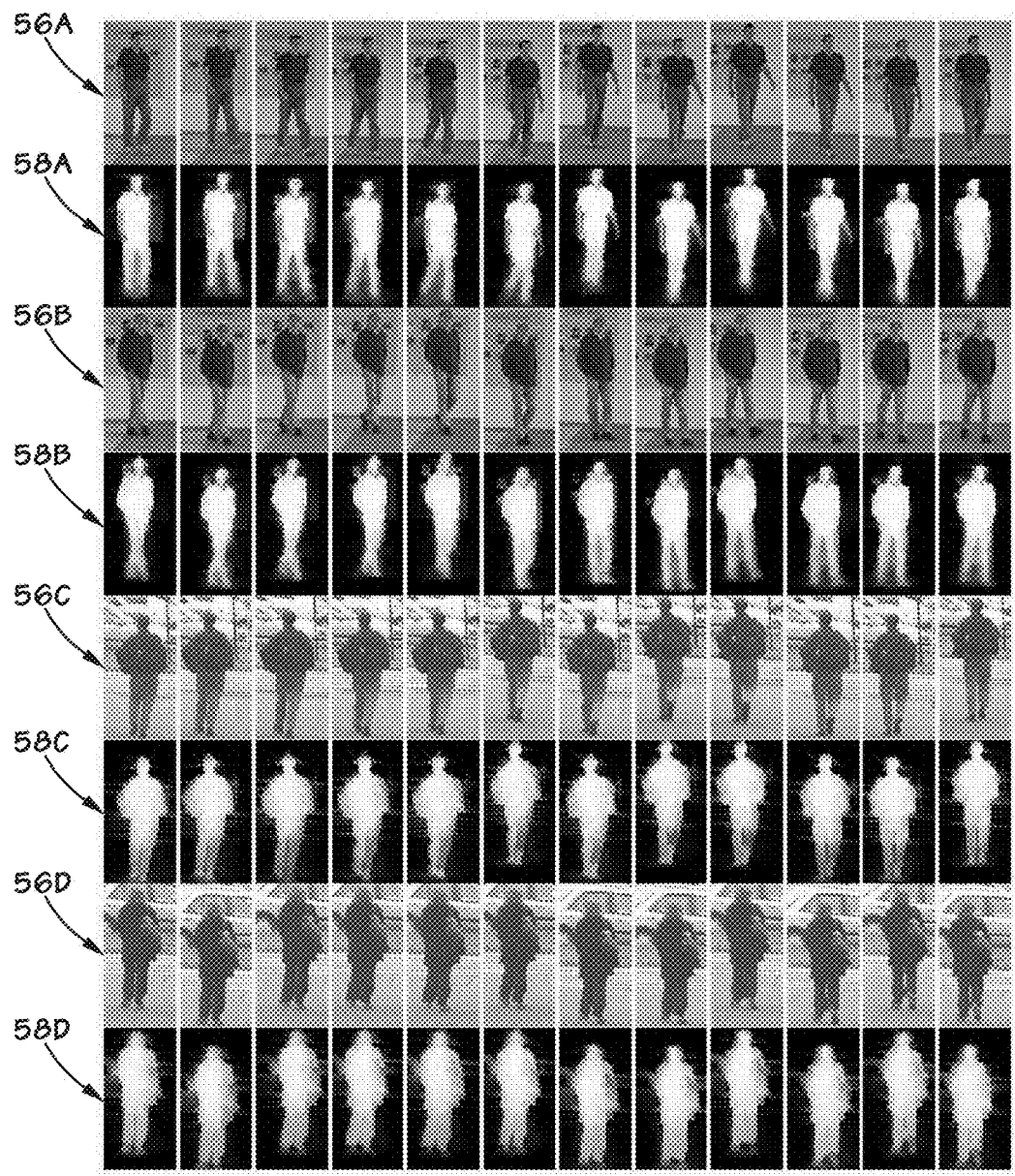

As outlined above, the results obtained from the still image experiments are very promising. Further, the capability to perform unsupervised video matting in accordance with the disclosed techniques was also demonstrated. The disclosed method was demonstrated on a per frame basis, to an indoor and outdoor sequence. FIG. 11 shows the results of the video matting, in accordance with the presently disclosed embodiments, where each row of video frames 56 A-D is followed by the corresponding matte maps 58A-D. The results demonstrate the utility of the disclosed algorithm for performing unsupervised video matting.

Experimental Summary

The disclosed experiments present a fully automatic matting algorithm, and shown that the algorithm is capable of consistently generating good matting results when applied to video sequences. Towards achieving a fully unsupervised matting algorithm, it is speculated that utilizing shape priors is more reliable than, for example, cues from spectral segmentation, due to the lower ambiguities. It has been demonstrated that the disclosed techniques provide video matting in a fully unsupervised fashion while producing good matting results. This is a significant contribution towards automatic video matting.

What is claimed is:

1. A method comprising:
    computing an initial alpha matte from an input image; and
    automatically updating the initial alpha matte, wherein automatically updating comprises:
        selecting one or more shape models from a shape model database, wherein the shape model database comprises a plurality of principal component analysis-based shape models trained using eigen analysis;
        incorporating the one or more shape models into the initial alpha matte;
        incorporating one or more alignment parameters into the initial alpha matte to align the one or more shape models in the initial alpha matte; and
        optimizing the initial alpha matte to obtain an optimized alpha matte, wherein optimizing the initial alpha matte to obtain the optimized alpha matte comprises iteratively solving a quadratic cost function to determine the one or more alignment parameters that produce a minimum value of the quadratic cost function.

2. The method of claim 1, wherein incorporating the one or more alignment parameters into the initial alpha matte comprises:
    calculating an updated alpha matte;
    calculating a shape basis coefficient; and
    calculating a transformation parameter.

3. The method of claim 2, wherein calculating the updated alpha matte, calculating the shape basis coefficient, and calculating the transformation parameter occur substantially simultaneously.

4. The method of claim 1, wherein iteratively solving the quadratic cost function to determine the one or more alignment parameters that produce a minimum value of the quadratic cost function comprises iteratively solving the quadratic cost function less than 20 times.

5. The method of claim 1, wherein calculating the initial alpha matte comprises extracting a foreground from a background of the input image.

6. The method of claim 5, wherein the input image comprises a video frame.

7. The method of claim 1, wherein calculating the initial alpha matte from the input image comprises calculating a plurality of alpha mattes from a plurality of images by extracting a foreground from a background of each of the plurality of images, wherein each of the plurality of images correspond to a frame of a video.

8. The method of claim 7, wherein the video comprises over 300 frames.

9. The method of claim 1, wherein the optimized alpha matte comprises an alignment error of less than 1.5 pixels along an x-axis of the alpha matte and less than 2.5pixels along a y-axis of the alpha matte.

10. The method of claim 1, wherein the shape model database comprises at least 150 principal component analysis-based shape models.

11. The method of claim 1, wherein computing the initial alpha matte from the input image and automatically updating the initial alpha matte are performed without human interaction.

12. The method of claim 1, wherein automatically updating the initial alpha matte does not include manually marking a foreground region or a background region.

13. A method for automatic video matting comprising:
    obtaining a plurality of images from a video, where each of the plurality of video images correspond to a frame of the video;
    utilizing one or more shape models from a shape model database to estimate an alpha matte for each of the plurality of images, wherein the shape model database comprises a plurality of principal component analysis-based shape models trained using eigen analysis; and
    aligning each of the plurality of images with the one or more shape models to estimate the alpha matte for each of the plurality of images, wherein aligning each of the plurality of images with the one or more shape models to estimate the alpha matte for each of the plurality of images comprises iteratively solving a quadratic cost function to determine one or more alignment parameters that produce a minimum value of the quadratic cost function.

14. The method of claim 13, wherein each of the plurality of video images is obtained from a person detector.

15. The method of claim 13, wherein utilizing the one or more shape models from the shape model database to estimate the alpha matte for each of the plurality of images and aligning each of the plurality of images are performed simultaneously.

16. A method, comprising:
    computing an initial alpha matte from an input image;
    selecting one or more shape models from a shape model database, wherein the shape model database comprises a plurality of principal component analysis-based shape models trained using eigen analysis;

inputting the one or more shape models into the initial alpha matte; and determining one or more alignment parameters of the initial alpha matte that align the one or more shape models with the input image to generate an updated alpha matte, wherein determining the one or more alignment parameters of the initial alpha matte that align the one or more shape models with the input image to generate an updated alpha matte comprises iteratively solving a quadratic cost function to determine the one or more alignment parameters that produce a minimum value of the quadratic cost function.

17. The method of claim 16, wherein iteratively solving the quadratic cost function to determine the one or more alignment parameters that produce a minimum value of the quadratic cost function comprises iteratively solving the quadratic cost function less than 20 times.

18. The method of claim 16, wherein calculating the initial alpha matte comprises automatically extracting a foreground from a background of the input image, and wherein the input image comprises a video frame.

\* \* \* \* \*